Patented Feb. 2, 1926.

1,571,739

UNITED STATES PATENT OFFICE.

WINFIELD SCOTT, OF WILMINGTON, DELAWARE, ASSIGNOR TO E. I. DU PONT DE NEMOURS & COMPANY, OF WILMINGTON, DELAWARE, A CORPORATION OF DELAWARE.

HARD, RESINOUS VULCANIZATION ACCELERATOR AND PROCESS OF MAKING SAME.

No Drawing.     Application filed December 19, 1922. Serial No. 607,883.

*To all whom it may concern:*

Be it known that I, WINFIELD SCOTT, a citizen of the United States, and a resident of Wilmington, in the county of New Castle and State of Delaware, have invented certain new and useful Hard, Resinous Vulcanization Accelerators and Processes of Making Same, of which the following is a specification.

This invention relates to new hard, resinous accelerators for rubber-vulcanization, and to a process of producing same, and comprises, as new compositions, the substances formed when formaldehyde is induced to react with the condensation products of aromatic amines preferably aniline, and straight chain aldehydes having a plurality of carbon atoms, preferably acetaldehyde.

Substances resulting from the condensation of an aromatic amine and an aldehyde having a plurality of carbon atoms have heretofore been proposed for use as vulcanization accelerators, but substances of this type that are the least expensive to produce are not satisfactory from a practical standpoint on account of their sticky and viscous character, especially in plants which are accustomed to working with accelerators in a dry, powdered condition.

This invention provides vulcanization accelerators which can be manufactured at a comparatively low cost, and which either are free from the disadvantages above mentioned, or have these disadvantages in much less degree.

Ethylidene-aniline, the name applied to the reaction product of equimolecular proportions of acetaldehyde and aniline is a syrupy oil that soon turns a dark red on exposure to the air. Upon drying in air or on long storage this syrupy material decomposes to some extent, becoming rather dark in color, with the formation of phenylcarbylamine.

By using about 1½ or 2 moles of acetaldehyde for each mole of aniline (in other words—3 or 4 moles of acetaldehyde for each two moles of aniline), another product is obtained, which upon drying in air, becomes quite dark in color. This material is a soft resin, and almost black in color. It readily softens from the heat of the hand and is rather sticky when warm.

I have now discovered that formaldehyde will react with condensation products of aromatic amines and straight chain (as distinguished from cyclic) aldehydes having more than one carbon atom, to form substances of ∗ complex molecular structure which are harder, and are more readily handled, than the original condensation products, and possess at least as good accelerating power. Thus I have found that formaldehyde will further react with the product obtained from the reaction of two moles of aniline and three moles of acetaldehyde to form a material of a hard brittle nature at ordinary temperatures, which does not soften when pressed between the fingers, and is quite stable. The color of this product in powdered form is yellow to brown, whereas the resin preliminarily obtained from aniline and acetaldehyde alone, when ground at low temperatures, is a dark reddish brown color.

Evidence of reaction of formaldehyde on this reaction product of aniline and acetaldehyde is shown by a rise in temperature after the addition of formaldehyde, and an increase in the viscosity of the heated product, as well as less stickiness before drying. I have not been able to prepare a product such as has been described above by the action of acetaldehyde or of methylene-diphenyl-diamine or of anhydroformaldehyde-aniline on the condensation product of acetaldehyde and aniline. The reaction product of aniline and a mixture of acetaldehyde and formaldehyde is not the same as that mentioned above, but appears to be merely a mixture of the Schiff's bases of the respective aldehydes.

The amount of formeldehyde used in the new process should in general be sufficient to substantially increase the hardness of viscosity of the condensation product. I have found that ordinarily it is preferable to use between about one-third and one molecular proportion of formaldehyde for each molecular proportion of the aromatic amine. This treatment of the aldehyde-aniline condensation product with formaldehyde is desirably carried on at a temperature above 80° C. and preferably at a temperature in the neighborhood of 95° C.

The reaction product of acetaldehyde and aniline which has been resinified by formaldehyde has several distinct advantages as an accelerator of vulcanization. This resinous material is easily handled, weighed and removed from pans or containers into which it is weighed before the milling operation, and need for master batches, which require extra time, labor, and power, is obviated by use of the formaldehyde-resinified material which may be milled into each batch of rubber and compound directly.

In addition rubber vulcanized with the formaldehyde-resinified product shows a higher tensile strength at the "optimum cure" as well as higher "ultimate tensile". Thus my new resin is a beneficial agent in the vulcanization of rubber in other ways as well as by its acceleration. The following formula:

| | Parts by weight. |
|---|---|
| Smoked sheet rubber | 100.0 |
| Sulfur | 3.5 |
| Zinc oxide | 3.0 |
| Accelerator | 0.30 | is one suitable for vulcanization of rubber when using the material prepared from the action of formaldehyde on the reaction product of one mole of aniline and one and one-half moles of acetaldehyde.

The process of making the new accelerators may be illustrated by the following example:—

Sixty-six parts (by weight) of acetaldehyde is run slowly into ninety-three parts (by weight) of aniline in a suitable container equipped with a cooling jacket, stirrer and condenser. The temperature of the mixture is allowed to rise gradually by its heat of reaction to about 70° C. Toward the end of the addition of acetaldehyde, a small amount of refluxing usually occurs for a short time, so that it is necessary that the condenser be equipped with brine or ice water to prevent the escape of acetaldehyde. After all the acetaldehyde has been added and no more refluxing of the aldehyde occurs, the mixture is maintained at 80–85° C. for about two hours to insure completion of the reaction. At this time, twenty-seven parts by weight of formaldehyde solution (37–40%) is added, whereupon the temperature rises about 10°. It is desirable to maintain the temperature above 85° C., as at lower temperatures the product becomes so stiff that difficulty is experienced in stirring. After the addition of the formaldehyde, stirring is continued for about two hours to allow for complete reaction after which vacuum is slowly applied and the water removed. After drying, the melted resin is drawn off into suitable containers and allowed to cool, when it is ready, after grinding, for use in rubber as an accelerator of vulcanization.

It will, of course, be understood that the process is not limited to the exact conditions given in the above example; these conditions, including times, temperatures, and proportions of reagents, may be varied considerably without departing from my invention.

The aldehyde-amine which I prefer to treat with formaldehyde is derived from acetaldehyde and aniline, and the one I now deem the best and which is set forth in my more specific claims, consists chiefly or entirely of the reaction product of 3 moles of acetaldehyde and 2 moles of aniline, but I do not desire, from the standpoint of my broader claims, to be thus limited, for propionaldehyde, butyraldehyde and straight or open chain aldehydes in general may be employed, and in place of aniline there may be used other aromatic (cyclic) amines such as the toluidines, naphthylamines, p-phenylene-diamine, and other mono- and polyamines, to all of which may be applied the term: arylamine. In place of formaldehyde, other equivalent substances containing active methylene groups may be used.

The new products constituting part of my invention may be referred to generically as methylene-alkylidene-arylamine compounds in which the alkylidene group contains more than one carbon atom.

I claim:

1. The process of making a rubber-vulcanization accelerator which comprises treating with formaldehyde the condensation product of one molecular proportion of an aromatic amine and more than one molecular proportion of a straight chain aldehyde containing a plurality of carbon atoms, the formaldehyde being used in amount sufficient to substantially increase the hardness or viscosity of the condensation product.

2. A process as set forth in claim 1 in which between about one-third and one molecular proportion of formaldehyde is used for each molecular proportion of the aromatic amine.

3. The process of making a rubber-vulcanization accelerator which comprises treating with formaldehyde the condensation product of one molecular proportion of aniline and one and about one-half molecular proportions of acetaldehyde, the formaldehyde being used in amount sufficient to substantially increase the hardness or viscosity of the condensation product.

4. A process as set forth in claim 3 in which between about one-third and one molecular proportion of formaldehyde is used for each molecular proportion of the aromatic amine.

5. A process as set forth in claim 3 in which the mixture obtained by treating the condensation product with formaldehyde is stirred at a temperature moderately above 80° C. until the reaction is completed.

6. A process as set forth in claim 3 in which the mixture obtained by treating the condensation product with formaldehyde is stirred at a temperature moderately above 80° C. until the reaction is completed, and is then subjected to reduced pressure to remove water.

7. A composition of matter comprising a methylene-alkylidene-arylamine compound capable of acting as a rubber-vulcanization accelerator.

8. The process of making a resin which comprises treating with formaldehyde the condensation product of an aromatic amine and a straight chain aldehyde containing a plurality of carbon atoms.

9. The process of making a resin which comprises treating with formaldehyde the condensation product of an aromatic monoamine and a straight chain aldehyde containing a plurality of carbon atoms.

10. The process of making a resin which comprises treating with formaldehyde the condensation product of aniline and a straight chain aldehyde containing a plurality of carbon atoms.

11. The process of making a resin which comprises treating with formaldehyde the condensation product of an aromatic amine and acetaldehyde.

12. A resin comprising a methylene-alkylidene-arylamine compound obtainable by treating with formaldehyde the condensation product of an aromatic amine and a straight chain aldehyde containing a plurality of carbon atoms.

13. A resin comprising a methylene-alkylidene-aniline compound, the alkylidene group containing an open chain of carbon atoms.

14. A resin comprising a methylene-alkylidene-aniline compound obtainable by treating with formaldehyde the condensation product of aniline and a straight chain aldehyde containing a plurality of carbon atoms.

15. A resin comprising a methylene-ethylidene-arylamine compound.

16. A resin comprising a methylene-ethylidene-arylamine compound obtainable by treating with formaldehyde the condensation product of acetaldehyde and an aromatic amine.

17. The formaldehyde derivative of the reaction product of a compound produced by the combination of two molecular equivalents of aniline with three molecular equivalents of acetaldehyde.

18. The process of preparing the reaction product of an aldehyde and an amine which comprises reacting formaldehyde with the product obtained by the union of three molecular proportions of acetaldehyde with two molecular proportions of aniline.

19. As a new composition of matter, a resinous compound formed by the action of formaldehyde on the condensation product of acetaldehyde and aniline.

20. Process comprising reacting formaldehyde with the condensation product of acetaldehyde and aniline.

21. Process comprising heating formaldehyde to below 125° C. with the condensation product of acetaldehyde and aniline.

22. A rubber vulcanization accelerator comprising the product formed by the action of formaldehyde on the condensation product of acetaldehyde and aniline.

23. A rubber vulcanization accelerator comprising the product formed by the action of formaldehyde on the condensation product of 3 moles of acetaldehyde and 2 moles of aniline.

24. As a new composition of matter, a resinous compound formed by the action of formaldehyde on the condensation product of three moles of acetaldehyde and two moles of aniline.

25. As a new composition of matter, a resinous compound formed by the action of formaldehyde on the condensation product of a straight chain aldehyde and an aromatic amine.

26. As a new composition of matter, the resinous compound formed by the action of between 2/3 and 2 moles of formaldehyde on the condensation product of 3 moles of acetaldehyde and 2 moles of aniline.

27. The process of making a rubber vulcanization accelerator which comprises causing acetaldehyde and aniline to react under conditions to produce a condensation product having substantially three moles of acetaldehyde and two moles of aniline, introducing formaldehyde into said condensation product while in fluid condition, maintaining the mixture at a temperature enabling stirring until the reaction is complete, evacuating water, and then cooling and grinding.

28. The process of making a rubber vulcanization accelerator, which comprises causing acetaldehyde and aniline to react in the proportion of substantially 3 moles of acetaldehyde to two moles of aniline, maintaining the temperature without substantial drop for a period in the neighborhood of two hours, introducing formaldehyde into said condensation product, whereby a rise in temperature is produced, maintaining the mixture at a temperature enabling stirring until the reaction is complete, evacuating water and then cooling and grinding.

In testimony whereof I affix my signature.

WINFIELD SCOTT.